(No Model.) 2 Sheets—Sheet 2.

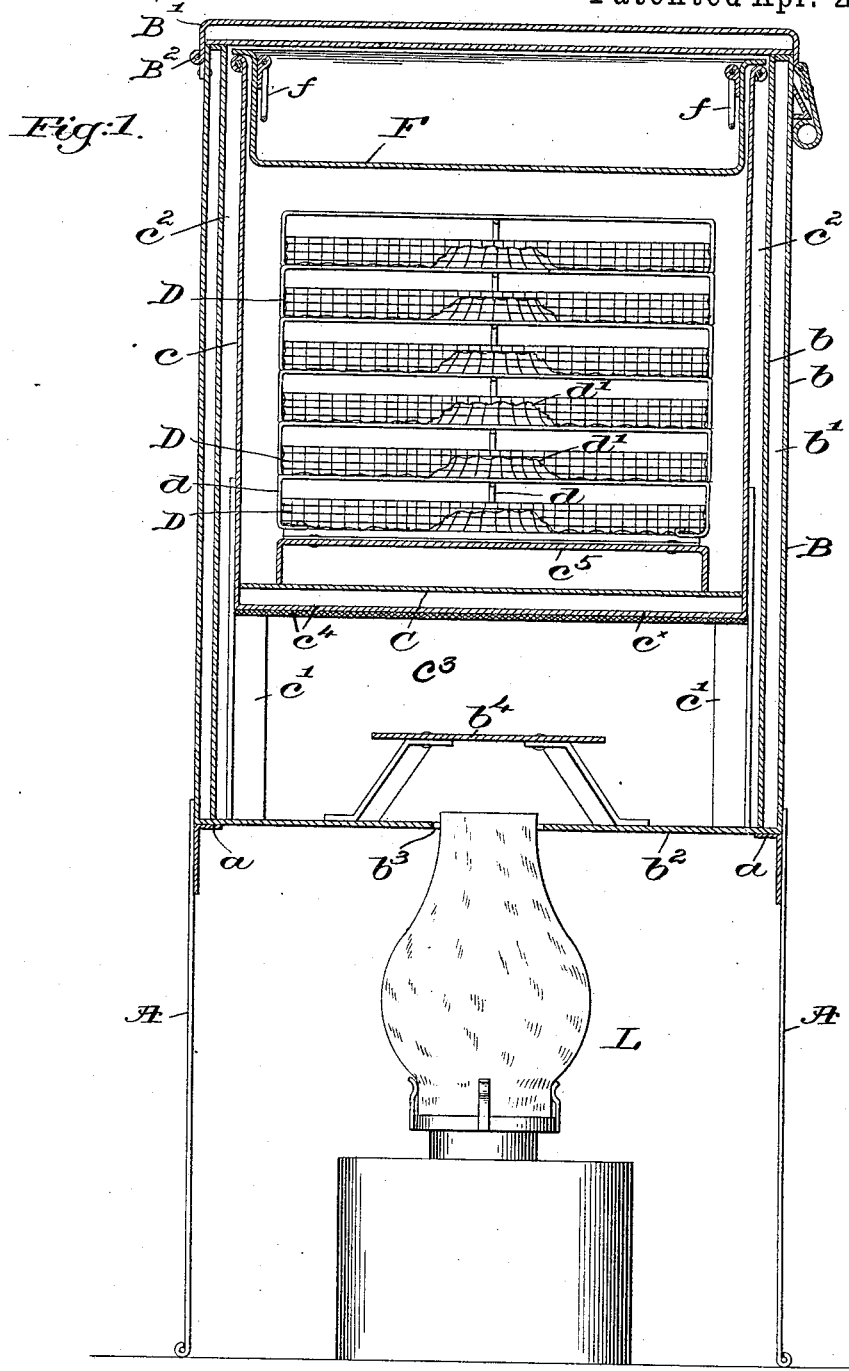

J. C. F. ATSATT.
APPARATUS FOR ROASTING NUTS.

No. 536,773. Patented Apr. 2, 1895.

Witnesses.
Fred S. Greenleaf
Louis N. Gowell

Inventor:
John C. F. Atsatt,
by Crosby & Gregory
Attys.

UNITED STATES PATENT OFFICE.

JOHN C. F. ATSATT, OF MATTAPOISETT, MASSACHUSETTS.

APPARATUS FOR ROASTING NUTS.

SPECIFICATION forming part of Letters Patent No. 536,773, dated April 2, 1895.

Application filed April 3, 1893. Serial No. 468,830. (No model.)

*To all whom it may concern:*

Be it known that I, JOHN C. F. ATSATT, of Mattapoisett, county of Plymouth, State of Massachusetts, have invented an Improvement in Apparatus for Roasting Nuts, of which the following description, in connection with the accompanying drawings, is a specification, like letters on the drawings representing like parts.

This invention relates to apparatus for roasting nuts, particularly peanuts, the principal object of the invention being to provide an apparatus in which the nuts to be roasted may be placed and left to roast without further attention. Whereas in apparatus for this purpose as now constructed the nuts are placed in a receptacle over a charcoal fire and require to be continually agitated by revolving the receptacle to prevent the nuts nearest the fire from being burned, in my improved apparatus I place the nuts in a series of vertically arranged shallow baskets within a chamber, and provide suitable heating apparatus by which the nuts are subjected to a uniform constant temperature, which warms and roasts them evenly throughout, without requiring any movement of the receptacle or baskets to prevent burning.

Figure 4:
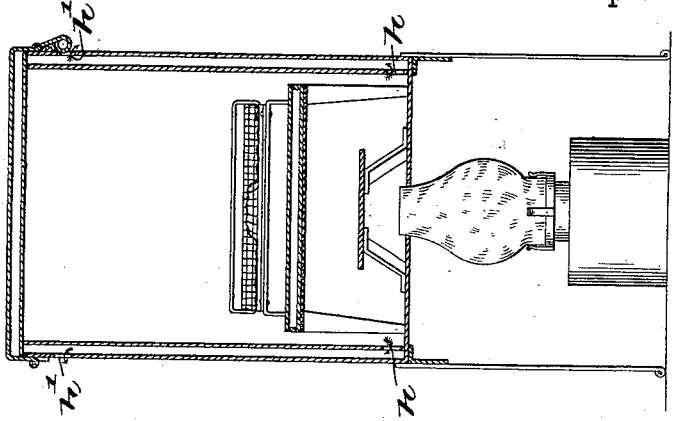
Figure 3:
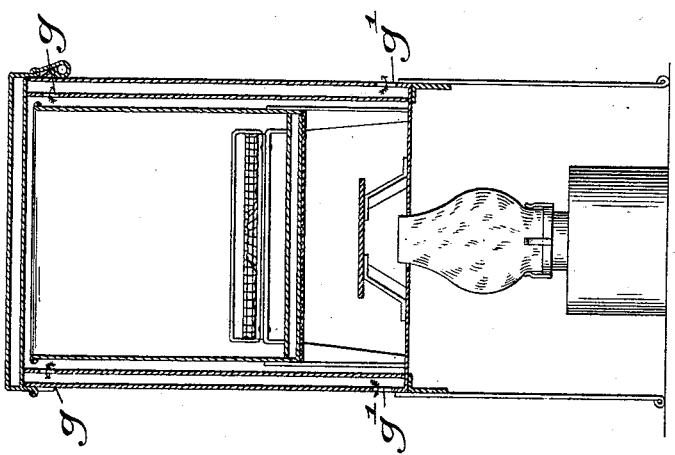
Figure 2:
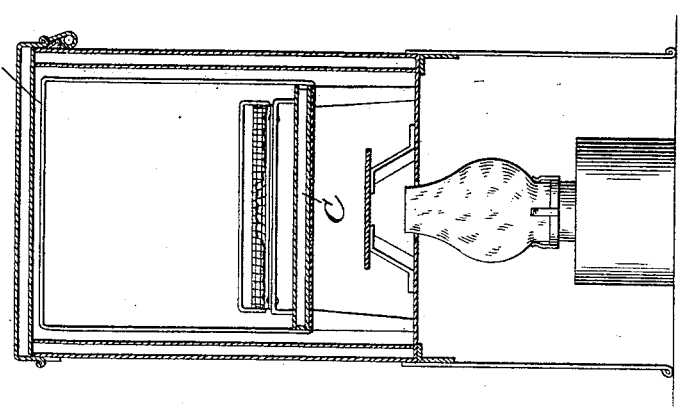

Figure 1 represents in vertical section the preferred form of apparatus embodying this invention; and Figs. 2, 3, and 4, similar views on a smaller scale showing modified forms of apparatus embodying the invention.

Referring to the drawings, Fig. 1, A, represents a suitable stand or support, it being provided at its upper side, as shown, with an annular lip $a$, upon which rests the inclosing shell B, herein shown as open at its top and provided with double side walls $b$, $b$, inclosing between them a closed non-conducting air space $b'$. The shell is preferably provided with a bottom $b^2$ having near its center a heat induction orifice $b^3$, beneath which, in the present instance, is placed a lamp L, the heat from which, as it rises, enters said orifice $b^3$. A deflecting plate $b^4$ is supported within the inclosing shell directly above the induction orifice, $b^3$, as shown, for a purpose to be hereinafter described.

Within the inclosing shell B, I place a basket support C, the same in the present construction constituting the bottom of a box-like receiver $c$, open at its top, as shown, and preferably supported upon legs $c'$ resting upon the bottom $b^2$ of the inclosing shell B. The receiver $c$ is made smaller than the interior of the inclosing shell, to leave a heating space $c^2$ between the sides of the receiver and the interior of the shell, a preferably greater space $c^3$ being left between the bottom of the receiver and the bottom of the inclosing shell as shown. The bottom of the receiver which constitutes the basket support is preferably protected by one or more false bottoms $c^x$ to render the same less capable of conducting heat readily, and the said bottom or support may be protected by a layer of non-conducting material $c^4$, such as asbestos. Within this receiver $c$ and preferably upon a raised stand $c^5$ upon the bottom of the same, I arrange a series of shallow, nut-holding baskets D, preferably formed of wire netting, in which the nuts to be roasted are placed. I preferably provide these baskets with handles $d$, the handles of one basket serving as supports for the next basket above, the baskets being thus stacked one upon another within the receiver, and upon the basket support C. Each of these baskets is preferably provided as shown with a circulating dome $d'$ formed by stamping up the bottom of the basket preferably at its middle, to thus provide a central aperture or passage-way vertically through the entire series of baskets, through which the heated air may circulate and thereby better reach the nuts near the center of the basket.

The inclosing shell B is provided with a cover B' hinged at B², which normally closes both the inclosing shell, and the receiver within the same.

The operation of my improved roasting apparatus is as follows:—The nuts to be roasted are first spread in the baskets D, which are placed one by one in the receiver $c$, either before or after the same has been placed in the inclosing shell B. After the baskets have all been placed in position, the cover B' is closed and the lamp L lighted. The heat from the lamp rises through the induction orifice $b^3$ and is deflected by the deflector plate $b^4$ toward the sides of the receiver, said heated air rising to the bottom of the receiver near its sides and following the said sides upwardly within the heating space $c^2$ until it reaches the top thereof, when it returns again down the outer sides of said heating space or next the interior of the inclosing shell to the space $c^3$ below the receiver where it is again heated to rise as before. The air confined within the receiver is thus heated and caused to circulate slowly through the nut-holding baskets to roast the nuts therein, the central domes $d'$ furnishing a passage for the heated air through the middle of the baskets as described. After the nuts have been sufficiently roasted, the heat from the lamp L may be reduced to a degree barely sufficient to keep the nuts warm, and if it is desired to have the nuts easy of access for selling, I have provided a receptacle F, flanged around its upper edge and adapted to be dropped within and supported upon the edges of the receiver, as shown, said receptacle being provided with handles $f$. In this receptacle I place a sufficient quantity of nuts to enable me to dispose of the same readily in selling, said receptacle being normally covered by the cover B' of the inclosing shell, but easy of access by throwing back the said cover when nuts are wanted, said receptacle all the time receiving sufficient heat from the lamp to keep the nuts warm.

In the apparatus shown in Fig. 1, the basket support C is provided with sides $c$ which constitute a receiver, the bottom of which is the basket support, but such sides are not essential, and in Fig. 2, I have shown a construction wherein the basket support C is without sides of any kind, it being, however, shown as provided with a bail $c^{10}$, by which it may be raised and lowered within the inclosing shell.

In Fig. 3, I have shown a construction adapted to provide a different circulation of the heated air within the apparatus.

In the construction Fig. 3, the heated air from the lamp rises through the heating space between the receiver and the inclosing shell, and instead of returning again down the sides of the inclosing shell within said space, it passes through openings $g$ at the top of the space into the annular chamber within the double walls of the inclosing shell, the air passing thence down between the said walls and out at the openings $g'$ at the bottom of the shell, as shown by the arrows.

In Fig. 4, I have shown yet another arrangement in which the heated air from the chamber rises and fills the chamber in which the baskets are located, and gradually falls to the bottom thereof as it cools, whence it escapes through the openings $h$ at the bottom into the annular space between the double walls of the inclosing shell, rising in said space and escaping through openings $h'$ at the top thereof, as shown by arrows.

These are but examples of the many ways in which an apparatus embodying this invention may be varied without departing from the spirit and scope of the invention.

The construction may be varied in other particulars than those shown, if desired, and still come within the limits of the invention.

An apparatus embodying this invention possesses merits which make it superior to any apparatus for this purpose heretofore known to me, for while in the apparatus for this purpose as usually constructed the receptacle in which the nuts are placed must be constantly agitated to prevent burning of a part of the nuts, in this my improved apparatus the lamp may be lighted and the apparatus permitted to remain without attention for such period of time as is required to properly roast the nuts, which may be indicated by a bell or other suitable alarm provided for that purpose, thereby making it possible for many to employ the apparatus for roasting nuts when they otherwise could not devote the requisite attention to the same.

While I have herein shown a lamp as a heating device, yet it is evident any other method of heating the air within the shell may be employed if the same is found preferable to a lamp.

I have herein shown the apparatus as constructed to open at the top, the several nut-holding baskets being lowered one by one through the top, but it is within the scope of this invention to provide a side door or doors by which the baskets may be introduced from the sides instead of from the top.

I claim—

1. In an apparatus for roasting nuts the combination of the following instrumentalities, viz:—an inclosing shell containing a chamber; an imperforate basket-support within said chamber; a series of nut holding baskets supported thereupon one above another, each basket being provided with supporting handles which constitute supports for the basket next above in the series; a heat induction orifice in said shell and opening into said chamber within the walls thereof and beneath said imperforate basket support, whereby heated air entering through said orifice is deflected by said support to the sides of yet within said chamber and caused to rise outside said baskets, and a heat generator to furnish heat, substantially as described.

2. An apparatus for roasting nuts containing the following instrumentalities, viz:—an inclosing shell containing a chamber; an imperforate basket support within said chamber and provided with substantially vertical sides to form a basket-containing receiver; a series of nut-holding baskets supported one above another in said receiver; a heat induction orifice in the bottom of said chamber beneath said support; and a heat generator to supply heat for said chamber through said orifice, said heat rising about and surrounding the walls of said receiver to thereby raise the temperature of the contents of said receiver without passing through the latter, substantially as described.

3. An apparatus for roasting nuts and the like containing the following instrumentalities, viz:—an inclosing shell provided with an imperforate basket support, a plurality of nut-holding baskets superimposed within said shell and upon said basket support and provided each with a perforated circulation dome, a heat generator to supply heat for the shell, said heat being deflected by the imperforate basket support outwardly to and to rise at the outside of the said nut-holding baskets, the circulation domes of the several baskets together furnishing a vertical flue through which heated air my rise with slight resistance to thereby act to draw the heated air inwardly from the sides and at the levels of the several baskets to cause the said heated air to thereby thoroughly circulate through the nuts contained in the several baskets, substantially as described.

4. In an apparatus for roasting nuts, the combination of the following instrumentalities, viz;—an inclosing shell having a bottom provided with a heat induction orifice, a receiver within said shell, and separated therefrom at its sides and bottom to leave a heating space, said receiver having a false bottom, constituting a basket-support, with a dead air space between it and the main bottom, a series of baskets arranged one above another within said receiver, and a heating device, to operate, substantially as described.

5. In an apparatus for roasting nuts, the combination of the following instrumentalities, viz;—an inclosing shell having a bottom provided with a heat induction orifice, a receiver within said shell, and separated therefrom at its sides and bottom to leave a heating space, the bottom of said receiver constituting a basket support, a series of baskets arranged one above another upon said support, a non-conducting substance, as asbestos, on said bottom to prevent the nuts in the lowest baskets from being burned, and a heating device, directly beneath said bottom substantially as described.

6. In an apparatus for roasting nuts, the combination of the following instrumentalities, viz;—an inclosing shell, a receiver supported within the same and having a closed imperforate bottom to constitute a basket support, a stand $c^5$ resting upon said support or bottom, and providing an air space between the latter and a series of nut-holding baskets resting upon said stand, and a heating device, substantially as described.

7. In an apparatus for roasting nuts, the combination of the following instrumentalities, viz;—an inclosing shell having a bottom provided with a heat induction orifice, a deflector arranged vertically above said orifice, a receiver within said shell and separated therefrom at its sides and bottom to leave a heating space, a series of baskets arranged one above another in said receiver, and a heating device arranged beneath said induction orifice, substantially as described.

In testimony whereof I have signed my name to this specification in the presence of two subscribing witnesses.

JOHN C. F. ATSATT.

Witnesses:
NOAH HAMMOND,
CLARA L. HAMMOND.